March 8, 1932.  A. WOLLENSAK  1,848,402

MICROMETER MOUNT

Filed Oct. 14, 1929

Inventor
Andrew Wollensak
by his attorney
Farnum F. Dorsey

Patented Mar. 8, 1932

1,848,402

UNITED STATES PATENT OFFICE

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK

MICROMETER MOUNT

Application filed October 14, 1929. Serial No. 399,582.

This invention relates to means for supporting and adjusting either or both the lens and the diaphragm of a photographic camera. While susceptible of various applications, it is particularly designed and useful for application to a cinematographic camera.

In a cinematographic camera it is common to focus the camera by means of a manually movable focusing ring, which surrounds the body of the lens mount and is connected with the lens by differential screw-threads or equivalent means. Since the focusing movement is very slight, it is necessary that it be produced and controlled without any substantial amount of looseness or lost motion in the mechanism. One object of the present invention is to produce a lens mount in which simple and effective means are provided for eliminating all lost motion and for producing a constant friction by which accidental movement of the focusing mechanism is prevented. To this end it is proposed to use a spring washer introduced between opposed shoulders on the relatively movable members by one of which the lens is supported, as will hereinafter be set forth.

Since the indexes of both the focusing mechanism and the diaphragm should be readable from the same point of view, they should cooperate either with a single stationary mark or with marks which are in alignment. In micrometer mounts as ordinarily constructed such alignment is attained only approximately, or with difficulty, since the two adjusting mechanisms are mounted on or associated with separate body members which are secured together by screw threads, and the alignment of the stationary marks on these two body members depends upon the relative positions of the body members when screwed home. A further object of the present invention is to eliminate this difficulty and source of inaccuracy, and this is accomplished by an arrangement of parts such that the lenses, the diaphragm and the two adjusting rings are all mounted in or on a single body member so that a single fixed mark on this member may cooperate with the indexes on the two adjusting rings.

Figure 1:
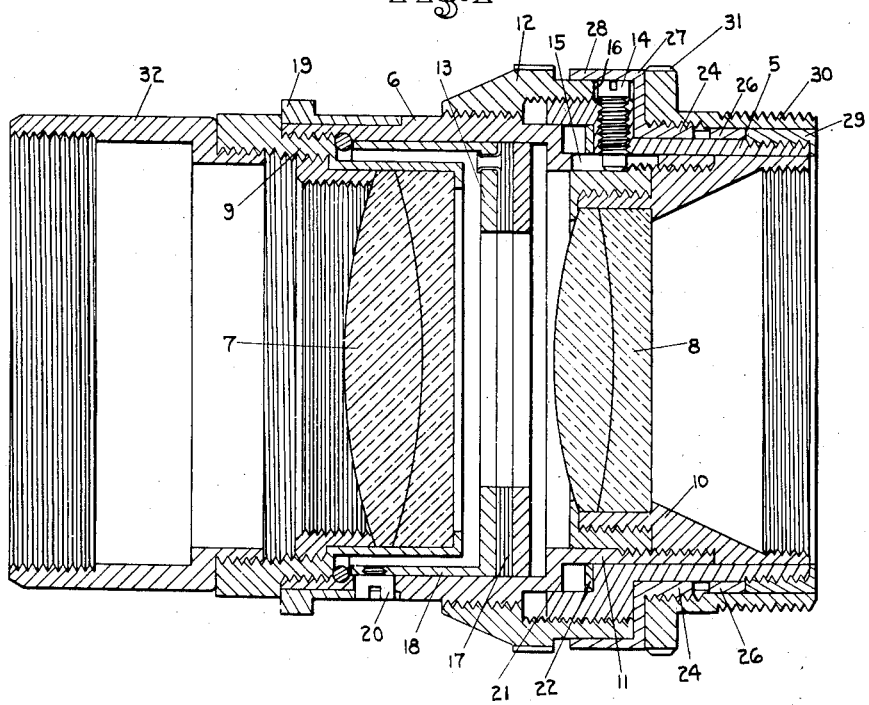
Figure 2:
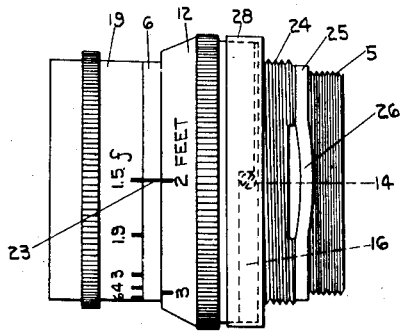
Figure 3:
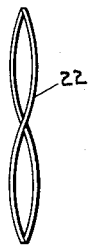

In the accompanying drawings Fig. 1 is a longitudinal section, on an enlarged scale, of a micrometer mount embodying the present invention. Fig. 2 is a plan view, on a smaller scale, of the same mount, with the hood and the mounting collar removed, and Fig. 3 is a side elevation of the spring washer interposed between the body rings of the mount.

The invention is illustrated as embodied in a micrometer mount of the type commonly used in connection with a cinematographic camera of the hand or amateur type. The body of the mount comprises two generally cylindrical members or tubes 5 and 6, which have a sliding or telescopic engagement with each other. The body tube 5 is normally stationary, while the body tube 6 carries the lenses and is movable axially for the purpose of focusing. Two compound lenses 7 and 8 are mounted in the usual cells 9 and 10, which are screwed in the front end and the rear end respectively, of the body tube 6. The rear portion 11 of this tube is of reduced diameter, so as to fit the inner surface of the body tube 5 and guide the tube 6 in its movements.

The focusing movement is produced by a focusing ring 12 which surrounds the body of the mount. This ring has a differential screw-thread engagement with the two body tubes, as shown in Fig. 1, so that rotation of the ring causes an axial movement of the tube 6. To prevent rotation of this tube, it is provided with a screw 14, of which the inner end engages a slot or recess 15 in the reduced part 11 of the tube. The head of the screw also serves to limit the rotation of the focusing ring, as it engages an elongated recess 16 in the rear edge of the ring, as shown in dotted lines in Fig. 2.

The amount is shown as provided with a diaphragm 17, supported by the body tube 6 and located between the two lenses. This diaphragm may be of the ordinary iris type and is not shown in detail, as the construction of such diaphragms is well known. For the purpose of adjusting the diaphragm, its forward rotatable member 13 is provided with a forwardly projecting cylindrical extension 18, which is connected, by means of a screw 20, with a diaphragm-adjusting ring 19, arranged to rotate about the body tube 6. It will be understood that this body tube is slotted to permit sufficient movement of the screw 20 to allow the ring 19 to be turned as far as necessary.

The spring means hereinbefore referred to, for taking up lost motion between the body tubes, has the form of a washer 22 of resilient sheet metal, which is bent in the form shown in Fig. 3. This washer is interposed between a shoulder 21, on the body tube 6, and the opposed shoulder of the body tube 5, and the resiliency of the washer is such that it presses against the shoulders in all positions of the focusing mechanism. The result is that all looseness between the focusing ring and the body tubes is constantly taken up in one direction, so that the position of the lens for focusing is accurately determined in accordance with the position of the focusing ring. The constant pressure of the washer also produces sufficient friction between the screw threads to hold the focusing ring firmly in the position to which it may be manually adjusted by the user.

Since the lenses and the diaphragm, and their adjusting rings 12 and 19, have a definite and permanent relation with the body tube 6, a single stationary index mark 23 on this tube serves to cooperate with the index marks and figures on both adjusting rings, and thus both adjustments may be made with the greatest facility from the same point of view at all times. It will be apparent however, that these index marks will be of little use unless they are located at the top of the mount, where they can be conveniently seen. To permit adjustment of the mark 23 to the desired position, the body of the mount is made revoluble with respect to the mounting ring which is screwed into the camera to support the mount, as hereinbefore mentioned. The mounting ring 30 has the usual screw-threaded exterior surface, and a knurled flange 31 by which it may be turned to screw it into the camera. Associated with this mounting ring is an inner ring 24, which is screwed into the mounting ring. The ring 24 is provided with a flange 27 and a cylindrical forward extension 28, which serve to cover the screw 14 and some of the joint surfaces and make a neat finish. At its rear margin the ring 24 has a smooth cylindrical portion 25, and this portion is slotted above and below, as shown in Fig. 2, so as to produce narrow strips 26 of the metal which are supported only at their ends. These strips are bent to a slightly bowed form, as shown in Fig. 2, thus producing frictional projections having a slight but sufficient resiliency. At the rear end of the body tube 5 a ring 29 is screwed upon its outer surface, and the space between the forward edge of this ring and the opposite shoulder of the body ring 5 is such that the ring 24 is firmly engaged between these members, the parts 26 bearing with substantial pressure and friction against the ring 29.

The friction between the parts last described is sufficient to prevent, normally, any rotation of the body of the mount during ordinary manipulation of the adjusting rings 12 and 19. However, when the mount is placed on the camera, by screwing the mounting ring in place, if it be found that the index mark 23 happens to be in an inconvenient position, it is necessary only to impart an extra degree of rotative force to the mount to cause slippage between the mounting ring and the body, whereby the body may be rotated to bring the mark 23 to a convenient position at the top.

In Fig. 1 the mount is shown as provided with the usual hood 32, which is omitted in Fig. 2. The inner surface of the hood and some of the other inner surfaces are shown as screw-threaded, not for constructional purposes but merely to break up the cylindrical surfaces and minimize the reflection of light from them.

The invention claimed is:

1. A micrometer mount comprising two generally cylindrical body members having a telescopic sliding engagement, for the purpose of focusing, one, at least, of said members being adapted to support a lens, a manually revoluble focusing ring surrounding the body members and having, at its inner surface, a differentially threaded engagement with the body members, the body members having stepped portions affording oppositely disposed shoulders, and a spring washer interposed between and pressing against said shoulders to take up lost motion between said members and the focusing ring.

2. A micrometer mount comprising a stationary body member and a movable body member telescopically engaged and provided with opposed shoulders, a lens mounted on the movable body member, a focusing ring surrounding the body members and having micrometric connection with the body members, in combination with a spring washer interposed between and pressing constantly against said opposed shoulders.

3. A micrometer mount comprising a stationary body member and a movable body member telescopically engaged, a lens carried by the movable body member, and a focusing ring surrounding the body and having micrometric connections with the members thereof to cause focusing movement of the movable member when the focusing ring is turned, in combination with resilient means acting against the body members and subjecting the micrometric connections to a constant pressure in one direction of operation.

4. A micrometer mount comprising a stationary body member and a movable body member telescopically engaged, a lens, a diaphragm, and means, including rotatable graduated rings, for focusing the lens and adjusting the diaphragm, the lens, the diaphragm and said graduated rings being all associated with and supported by said movable body member in permanent and definite relation therewith, and said body member being marked to cooperate with the graduations on said rings.

ANDREW WOLLENSAK.